May 21, 1946.  A. J. ROWLEDGE ET AL  2,400,714
JET-PROPULSION POWER-UNIT
Filed Aug. 12, 1943  3 Sheets-Sheet 3
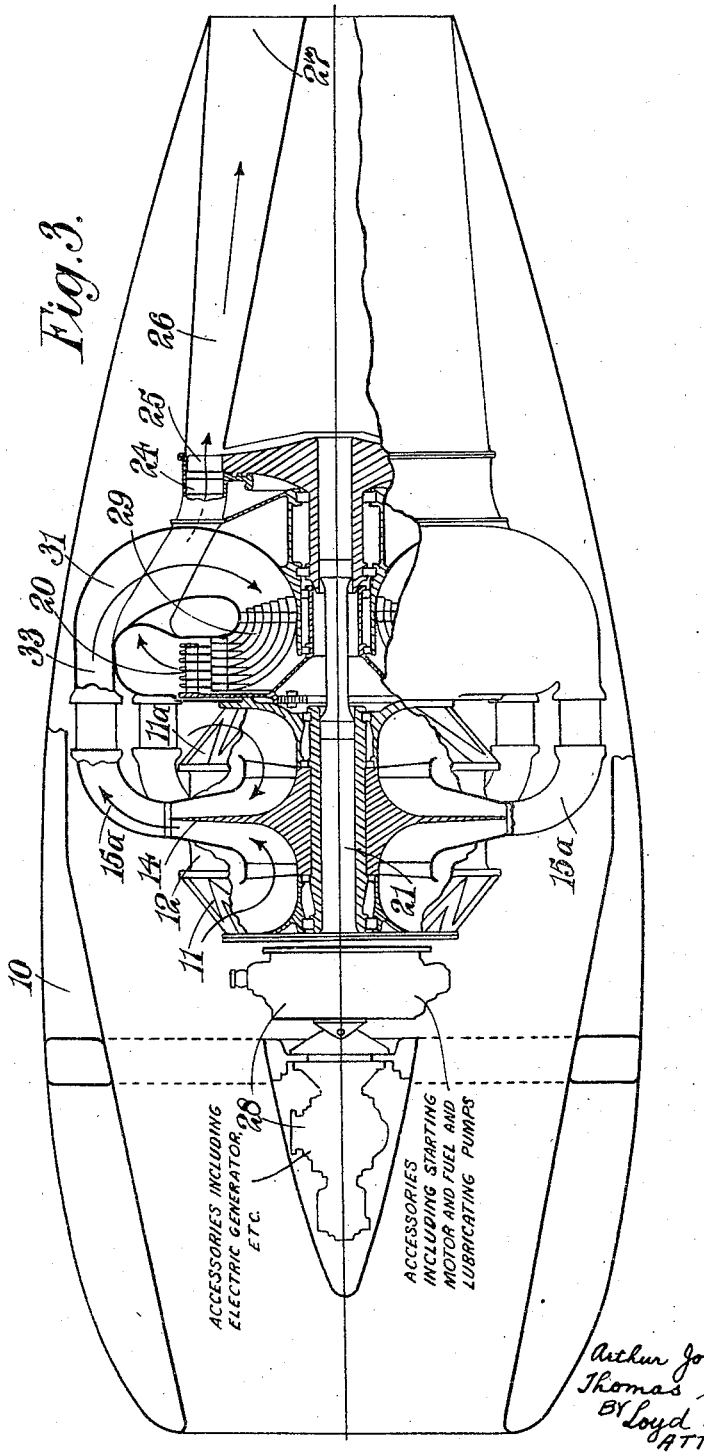

Patented May 21, 1946

2,400,714

UNITED STATES PATENT OFFICE 2,400,714

JET PROPULSION POWER UNIT

Arthur John Rowledge, Derby, and Thomas Shelley, Breaston, England

Application August 12, 1943, Serial No. 498,418
In Great Britain June 11, 1942

2 Claims. (Cl. 60—35.6)

This invention relates to jet-propulsion power-units, such as are suitable for use on aircraft, of the type comprising an air-compressor, means for heating the air as, for example, by burning fuel in it, a turbine which is driven by the heated air or products of combustion and drives the compressor and a reaction jet through which the exhaust gases from the turbine are delivered. The object of the invention is to provide an improved construction and arrangement of such power-unit which shall be of small overall dimensions, and particularly of a small frontal area.

If a centrifugal compressor be used, it is necessary to provide on its outlet a certain length of divergent passage in order to obtain the required degree of conversion of the kinetic energy of the air to pressure energy before the air reaches the fuel burner or other source of heat, and in order to provide this length of passage within reasonable overall dimensions, this invention provides, in a jet-propulsion power-unit of the type described, the combination with a centrifugal compressor, of an annular outlet passage which is curved as viewed in axial section of the power unit, from a radially outward direction so as to extend radially inwardly and then radially outwardly to provide the required length of passage for the energy conversion aforesaid within the minimum overall dimensions.

In one form according to this invention, the aforesaid shaping is obtained by forming the passage with two successive bends each of substantially 180° but in the same direction, so that the radially outward part of the passage lies between the compressor and the radially inward part of the passage, and the passage is then continued as a number of separate ducts extending the radially outward part of the passage in a substantially axial direction to the turbine and rearwardly directed reaction jet.

Two arrangements in accordance with this invention will now be described, by way of example only, with reference to the accompanying drawings in which:

Figure 3 is a diagrammatic longitudinal section through the second arrangement.

Like references indicate like parts in all the figures of the drawings.

Figure 1:
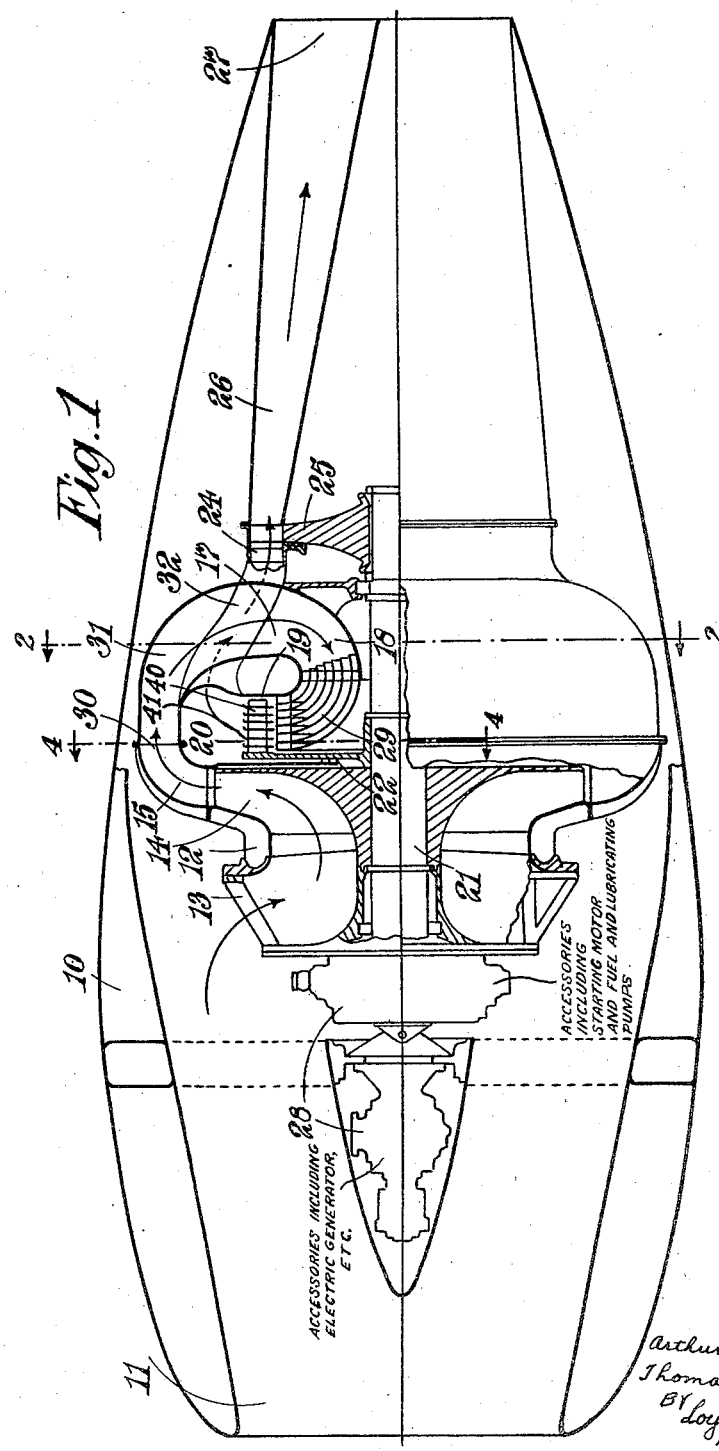
Figure 1 is a diagrammatic longitudinal section through the first arrangement.

In the arrangement shown in Figure 1, a jet propulsion power unit is mounted within a nacelle 10 which is open at its front end 11. The power-unit comprises a single-entry centrifugal blower 12 with the air-inlet 13 situated at the forward end, and a rotor 14 which is secured on a shaft 21. This blower 12 delivers air radially outwards into an annular diffuser chamber 15 of which the radially outer end is curved by an easy bend through 90° as shown at 30 and extends a short distance axially. The passage is then curved through 90° as shown at 31 and continued radially inwards as a passage 17 of expanding cross-section which will effect the desired conversion of the kinetic energy of the air to pressure energy. Where this air passage approaches the central shaft of the power-unit it is again bent outwardly at 18 through 180° to form another radial part 19 of the passage which extends radially outwards between the compressor 12 and the radial portion 17 of the passage and in which is mounted an oil-fuel burner 20 which is of a fan-like construction and has the fuel distributed over the blades so as to be delivered centrifugally therefrom in an intimate mixture with the air.

Figure 4:
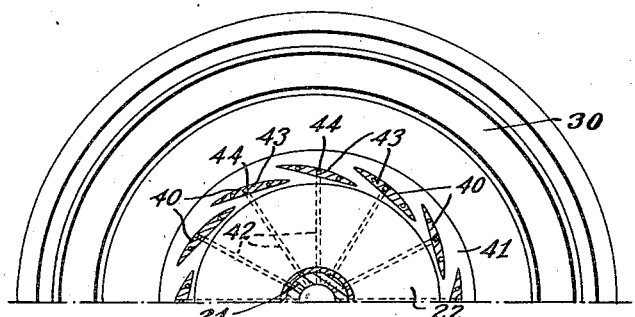
Figure 4 is a half section on the line 4—4 of Fig. 1.

The burner comprises a disc 22 secured on the shaft 21 to rotate therewith and carrying a number of fan blades 40 to which a number of annular guide vanes 41 are secured. Liquid fuel is supplied from the centre of the shaft 21 through radial passages 42 in the disc 22 (Fig. 4) to passage 43 extending lengthwise through each blade 40. A series of outlets 44 extend from each passage 42 to the outer surface of the blade 40 and the fuel issuing from these outlets spreads over the outer surface of the blade as a thin film in intimate contact with the compressed air passing between the blades so that complete combustion takes place just outside the ring of blades.

The burner is driven by the shaft 21 and rotates as a fan in the radial air flow at the appropriate speed for the air flow to its blades. Each blade will thus cut through the air flowing past it and will be swept by this air.

Figure 2:
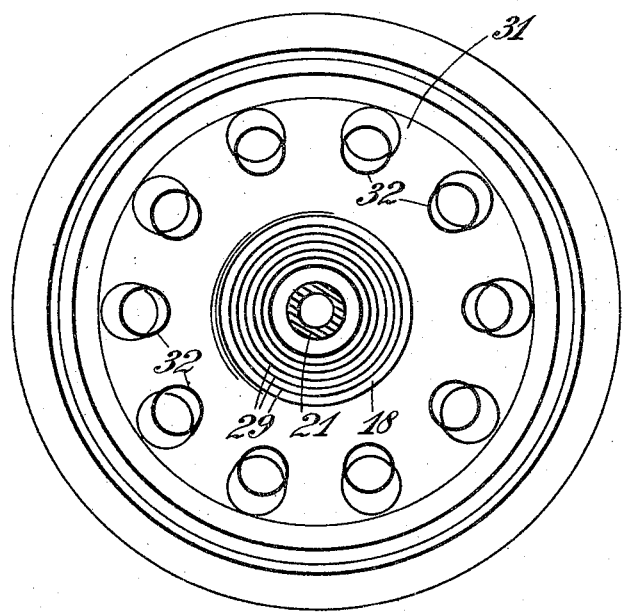
Figure 2 is a section on the line 2—2 of Figure 1.

From the burner, the passage for the products of combustion is continued as a number of separate ducts 32 (see Figure 2) which extend more or less axially through the radial portion 17 of the passage to an annular part of the passage containing guide-vanes 24 which direct these gases on to the blades of a turbine-wheel 25 mounted at the rear end of the shaft 21 of the power-unit. From this wheel the exhaust gases pass by an annular passage 26 of diverging cross-section to a reaction jet 27 at the rear end of the nacelle where they issue to atmosphere. Fixed guide-vanes 29 are provided in the bend 18 to direct the air-flow uniformly to the burner and it should be noted that the air passage is annular throughout its length. It will be seen that the width of the part 17 of the passage is increased so that its area is not reduced by the ducts 32 that pass through it.

The various accessories indicated at 28 for the power-unit are mounted at the forward end beyond the inlet to the compressor, and may comprise a fuel pump, a starting motor, lubricating pumps and any other necessary devices.

With this arrangement, the curvature of the passage immediately beyond the compressor is divided into two right-angled bends so that frictional losses can be reduced. Another advantage of this construction is that where the separate ducts 32 for the products of combustion pass through the air-supply duct, a transfer of heat takes place to the incoming air, pre-heating it before combustion takes place. This arrangement also provides as compared with prior arrangements a rather greater length of passage for the conversion of kinetic to pressure energy in the air, and at the same time reduces the overall diameter and the length of the unit, thus reducing the frontal area of the nacelle correspondingly.

In the above-described construction, the compressor was of the single-entry type, but a double-entry compressor may be used as shown in Figure 3, in which the outlet passage from the compressor 14 takes the form of a number of separate ducts 15A between which the air can pass to the rear inlet 11A of the compressor 12. These separate ducts all open into a single annular chamber 33 which is curved so as to extend radially inwards and outwards as above-described with reference to Figure 1.

A particular advantage of the present constructions lies in the fact that it is possible to reduce the overall dimensions, particularly transverse to the axis of the unit, as compared with known jet-propulsion units of the same power, and that the general lay-out of the unit lends itself to effective stream-lining of the nacelle or cowling in which it is enclosed. Furthermore the area of the surface radiating heat to the external atmosphere is reduced by this combustion.

We claim:

1. In a jet-propulsion power-unit, the combination with a centrifugal air-compressor, of an annular outlet passage from the air-compressor which is curved, as viewed in axial section of the power-unit, from a radially outward direction through substantially 180° so as to extend radially inwardly and then through substantially 180° in the same direction to extend radially outwardly between the air-compressor and the radially inward part of the passage to provide the required length of passage to convert the kinetic energy of the air to pressure energy within the minimum overall dimensions, and which passage is continued as a number of separate ducts extending through the radially inward part of the passage in a substantially axial direction, a turbine to which the air is delivered through the passage, means for burning fuel in the air in the passage, and a reaction jet through which the exhaust gas from the turbine is discharged.

2. The combination according to claim 1, wherein the compressor is of the double-entry type and the portion of the passage nearest the compressor is formed as a number of ducts extending over one entry to the compressor, whereby air has access between them to that entry.

ARTHUR JOHN ROWLEDGE.
THOMAS SHELLEY.